US010769556B2

(12) United States Patent
Caffo et al.

(10) Patent No.: US 10,769,556 B2
(45) Date of Patent: Sep. 8, 2020

(54) FRAMEWORKS AND METHODOLOGIES CONFIGURED TO ENABLE INTEGRATION OF BOOKING AND ACCESS CONTROL FOR SERVICE PROVIDERS

(71) Applicant: IP KEY PTY LTD, Berowra, New South Wales (AU)

(72) Inventors: Giuseppe Maria Caffo, Sydney (AU); Lawrance Crestani, Sydney (AU)

( * ) Notice: Subject to any disclaimer, the term of this patent is extended or adjusted under 35 U.S.C. 154(b) by 510 days.

(21) Appl. No.: 15/328,779

(22) PCT Filed: Jul. 27, 2015

(86) PCT No.: PCT/AU2015/000442
§ 371 (c)(1),
(2) Date: Jan. 24, 2017

(87) PCT Pub. No.: WO2016/011494
PCT Pub. Date: Jan. 28, 2016

(65) Prior Publication Data
US 2019/0057323 A1 Feb. 21, 2019

(30) Foreign Application Priority Data

Jul. 25, 2014 (AU) ................................ 2014902888

(51) Int. Cl.
*G06Q 10/02* (2012.01)
*G06Q 50/12* (2012.01)
(Continued)

(52) U.S. Cl.
CPC ....... *G06Q 10/02* (2013.01); *G06Q 10/06314* (2013.01); *G06Q 50/12* (2013.01);
(Continued)

(58) Field of Classification Search
CPC .. G06Q 10/02; G06Q 10/06314; G06Q 50/12; G07B 15/02
(Continued)

(56) References Cited

U.S. PATENT DOCUMENTS 8,401,468 B2 * 3/2013 Helvick ............... G06Q 10/109
340/5.1
2010/0318637 A1 * 12/2010 Ly ......................... G06F 9/5083
709/221
(Continued)

FOREIGN PATENT DOCUMENTS

WO 2001063425 8/2001

*Primary Examiner* — Vanel Frenel
(74) *Attorney, Agent, or Firm* — Ware, Fressola, Maguire & Barber LLP (57) ABSTRACT

Described herein are frameworks and methodologies configured to enable integration of booking and access control for service providers. Embodiments of the invention have been particularly developed for allowing a user to gain access to an access controlled resource (for example a hotel room or the like) via a mobile device. This preferably occurs in the context of an arrangement where access rights are provided in real time upon completion of a booking. For example, some embodiments operate in the context of a mobile app and associated supporting infrastructure thereby to provide functionality to (i) find an available suitable resource; (ii) book that resource; (iii) provide payment; and (iv) gain access via the same mobile device. In some embodiments the technology leverages third party platforms for (i) to (iii), and provides (iv) based on output from processes at the third party platform(s). While some embodiments will be described herein with particular reference to that application, it will be appreciated that the invention is not limited to such a field of use, and is applicable in broader contexts.

12 Claims, 7 Drawing Sheets

(51) Int. Cl.
*G06Q 10/06* (2012.01)
*G07B 15/02* (2011.01)
*G07C 9/00* (2020.01)
*H04W 84/12* (2009.01)

(52) U.S. Cl.
CPC ......... *G07B 15/02* (2013.01); *G07C 9/00174* (2013.01); *H04W 84/12* (2013.01)

(58) Field of Classification Search
USPC .................. 705/5, 7, 304, 37; 709/223, 224; 715/752
See application file for complete search history.

(56) References Cited

U.S. PATENT DOCUMENTS

| | | | | |
|---|---|---|---|---|
| 2012/0109419 | A1* | 5/2012 | Mercado | G06Q 10/02 701/2 |
| 2012/0221473 | A1* | 8/2012 | Redmann | G06Q 30/06 705/50 |
| 2013/0163489 | A1* | 6/2013 | Lee | H04W 4/18 370/310 |
| 2014/0337519 | A1* | 11/2014 | Raleigh | H04L 67/2804 709/224 |
| 2014/0344420 | A1* | 11/2014 | Rjeili | H04L 43/04 709/220 |
| 2015/0304332 | A1* | 10/2015 | Ruth | H04L 43/50 726/7 |
| 2016/0127566 | A1* | 5/2016 | Sharma | G06Q 30/0201 379/114.24 |

* cited by examiner

FRAMEWORKS AND METHODOLOGIES CONFIGURED TO ENABLE INTEGRATION OF BOOKING AND ACCESS CONTROL FOR SERVICE PROVIDERS

FIELD OF THE INVENTION

The present invention relates to frameworks and methodologies configured to enable integration of booking and access control for service providers. Embodiments of the invention have been particularly developed for allowing a user to gain access to a resource that is associated with an access control device, for instance a hotel room or the like, via a mobile device. For example, this is in some embodiments implemented in the context of an arrangement where access rights are provided in real time upon completion of a booking. While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

Booking of hotel rooms and the like via the Internet is extremely popular. However, bookings made over the Internet still typically require human intervention in order to complete a check in procedure. This can be practically problematic, for example where check in is not available.

SUMMARY OF THE INVENTION

It is an object of the present invention to overcome or ameliorate at least one of the disadvantages of the prior art, or to provide a useful alternative.

One embodiment provides a computer implemented method, performed by one or more server devices, configured to enable managing bookings and access control, the method including:

providing an interface that is configured to communicate with a plurality of client mobile devices, wherein each client mobile device executes a prescribed software application, wherein each executing instance of the prescribed software application is configured to provide a user interface that:

(i) identifies a resource in respect of which a time-specific booking has been made; and (ii) provides a user interface component configured to enable the user to access an access-controlled functionality provided by an access control device associated with the time specific booking;

receiving a signal representative of completion of a booking of a resource, wherein the booking is associated with: a specific access control device; a user account; and timing parameters;

based on the received signal, configuring the user interface of a specific one of the client mobile devices, being a client mobile device associated with the user account, to: (i) provide data identifying the booked resource as the resource in respect of which a time-specific booking has been made; and (ii) configure the user interface component configured to enable the user to access an access-controlled functionality provided by the specific access control device in accordance with the timing parameters.

One embodiment provides a computer implemented method including, in response to the receiving of the signal representative of completion of a booking of a resource, wherein the booking is associated with: a specific access control device; a user account; and timing parameters:

setting an access permission associated with the user account for the access control device; and receiving, from the specific one of the client mobile devices, via user interaction with the user interface component, a request to access a controlled functionality of the specific access control device;

processing the request based on the access permission;

determining that the request is to be granted; and providing a signal that is configured to cause the specific access control device to grant access to the controlled functionality.

One embodiment provides a computer implemented method wherein the specific access control device is a door lock, and wherein the controlled functionality is unlocking of the door lock.

One embodiment provides a computer implemented method wherein the specific access control device includes an access prevention apparatus, and the controlled functionality includes progressing the access prevent apparatus from a first state to a second state.

One embodiment provides a computer implemented method wherein the specific access control device includes a visual display component, and the controlled functionality includes progressing the visual display component from a first state to a second state.

One embodiment provides a computer implemented method wherein the resource includes an accommodation.

One embodiment provides a computer implemented method wherein the resource includes a parking space.

One embodiment provides a computer implemented method wherein the accessing of the access-controlled functionality of the networked device is achievable in an online mode and an offline mode, wherein the online mode leverages Internet communications between the mobile device and the networked locking device via one or more remote intermediaries and the offline mode leverages local WiFi communications between the mobile device and the networked locking device via none or more local intermediaries.

One embodiment provides a computer implemented method wherein the bookings of the resource is managed by a booking engine, and wherein the bookings engine is configured to determine booking availability of a resource based on time slices for which access control permissions are granted in respect of an access control device associated with the resource.

One embodiment provides a computer implemented method including providing an interface that is configured to enable the user to place a booking via the prescribed software application.

One embodiment provides a computer implemented method, performed by a mobile device, configured to enable access control in respect of one or more bookings, the method including:

executing a prescribed software application that is configured to interact with one or more server devices, wherein of the prescribed software application is configured to provide a user interface that:

(i) identifies a resource in respect of which a time-specific booking has been made; and (ii) provides a user interface component configured to enable the user to access an access-controlled functionality provided by an access control device associated with the time specific booking;

via a booking interface displayed at the mobile device, completing a booking process in respect of a resource thereby to define a booking at a server device, wherein the booking is associated with: a specific access control device; a user account; and timing parameters;

based on completion of the booking process, receiving a signal from a server device, wherein the signal configures the user interface of the mobile device to: (i) provide data identifying the booked resource as the resource in respect of which a time-specific booking has been made; and (ii) configure the user interface component configured to enable a user of the mobile device to access an access-controlled functionality provided by the specific access control device in accordance with the timing parameters.

One embodiment provides a computer implemented method wherein a server device is configured to, in response to completion of the booking process, perform a method including:

setting an access permission associated with the user account for the access control device; and receiving, from the mobile device, via user interaction with the user interface component, a request to access a controlled functionality of the specific access control device;

processing the request based on the access permission;

determining that the request is to be granted; and providing a signal that is configured to cause the specific access control device to grant access to the controlled functionality.

One embodiment provides a computer implemented method wherein the specific access control device is a door lock, and wherein the controlled functionality is unlocking of the door lock.

One embodiment provides a computer implemented method wherein the specific access control device includes an access prevention apparatus, and the controlled functionality includes progressing the access prevent apparatus from a first state to a second state.

One embodiment provides a computer implemented method wherein the specific access control device includes a visual display component, and the controlled functionality includes progressing the visual display component from a first state to a second state.

One embodiment provides a computer implemented method wherein the resource includes an accommodation.

One embodiment provides a computer implemented method wherein the resource includes a parking space.

One embodiment provides a computer implemented method wherein the accessing of the access-controlled functionality of the networked device is achievable in an online mode and an offline mode, wherein the online mode leverages Internet communications between the mobile device and the networked locking device via one or more remote intermediaries and the offline mode leverages local WiFi communications between the mobile device and the networked locking device via none or more local intermediaries.

One embodiment provides a computer implemented method wherein the bookings of the resource is managed by a booking engine, and wherein the bookings engine is configured to determine booking availability of a resource based on time slices for which access control permissions are granted in respect of an access control device associated with the resource.

One embodiment provides a computer implemented method including providing an interface that is configured to enable the user to place a booking via the prescribed software application.

One embodiment provides a method for managing bookings and access control, the method including:

(i) maintaining a cloud-hosted bookings engine, wherein the cloud-hosted bookings engine enables bookings at a plurality of client sites, wherein each booking is associated with a specific networked locking device;

(ii) enabling a user associated with a given booking to unlock a networked locking device associated with that booking via an unlock command provided by a mobile device.

One embodiment provides a computer implemented method including implementing a synchronisation protocol thereby to enable synchronisation of booking and user data between the cloud-hosted bookings engine and a provider system associated with a given client site, in respect of bookings associated with networked access control devices at that client site.

One embodiment provides a computer implemented method including receiving a signal from a client device indicative of a service completion event, the signal being associated with a specific access control device, and in response to the signal transitioning a resource associated with the access control device into an available state for booking purposes.

One embodiment provides a method including monitoring access to doors that are configured to be locked by the respective access control devices.

One embodiment provides a method including providing an alert where a door is accessed at a time for which no booking data is maintained.

One embodiment provides a method including enabling a user associated with a given booking to unlock a plurality of networked access control devices associated with that booking via respective unlock command provided by a mobile device.

One embodiment provides a method including enabling a user to purchase additional services, and in response to the purchase of an additional service enabling the user to access one or more additional networked functionalities via the mobile device.

One embodiment provides a method including enabling multiple users associated with a given booking to unlock the networked access control device associated with that booking via an unlock command provided by their respective mobile devices.

One embodiment provides a method, performed via execution of a software application at a mobile device, for managing bookings and access control, the method including:

(i) communicating, via networked communications, with a server device thereby to complete a booking in respect of a resource, wherein the resource is associated with a networked access control device; and following (i), providing a function thereby to provide a signal to selectively unlock the networked access control device.

One embodiment provides a computer implemented method wherein the function is provided only when within a threshold proximity of the networked access control device.

One embodiment provides a method for managing vehicle parking, the method including:

enabling a user of a mobile device to perform a query, thereby to identify a parking space that is available at a desired location for a desired time period;

enabling the user of the mobile device to complete a booking process in respect of the identified parking space, thereby to define a booking;

in response to the completion of the booking, configuring a display device proximal the parking space to provide data representative of the booking.

One embodiment provides a method for managing bookings and access control, the method including:

(i) communicating, via networked communications, with a mobile device that executes a prescribed software application;

(ii) determining that the mobile device has completed a booking in respect of a resource, wherein the resource is associated with a networked locking device; and (iii) following (ii), enabling the mobile device to selectively unlock the networked locking device.

One embodiment provides a method wherein the resource includes an accommodation.

One embodiment provides a method wherein the unlocking of the networked device is achievable in an online mode and an offline mode, wherein the online mode leverages Internet communications between the mobile device and the networked locking device via one or more remote intermediaries and the offline mode leverages local WiFi communications between the mobile device and the networked locking device via none or more local intermediaries.

One embodiment provides a method for managing bookings and access control, the method including:

(i) maintaining a cloud-hosted bookings engine, wherein the cloud-hosted bookings engine enables bookings at a plurality of client sites, wherein each booking is associated with a specific networked locking device;

(ii) enabling a user associated with a given booking to unlock a networked locking device associated with that booking via an unlock command provided by a mobile device.

One embodiment provides a method including implementing a synchronisation protocol thereby to enable synchronisation of booking and user data between the cloud-hosted bookings engine and a provider system associated with a given client site, in respect of bookings associated with networked locking devices at that client site.

One embodiment provides a method including receiving a signal from a client device indicative of a service completion event, the signal being associated with a specific locking device, and in response to the signal transitioning a resource associated with the locking device into an available stated for booking purposes.

One embodiment provides a method including monitoring access to doors that are configured to be locked by the respective locking devices.

One embodiment provides a method including providing an alert where a door is accessed at a time for which no booking data is maintained.

One embodiment provides a method including enabling a user associated with a given booking to unlock a plurality of networked locking devices associated with that booking via respective unlock command provided by a mobile device.

One embodiment provides a method including enabling a user to purchase additional services, and in response to the purchase of an additional service enabling the user to access one or more additional networked functionalities via the mobile device.

One embodiment provides a method including enabling multiple users associated with a given booking to unlock the networked locking device associated with that booking via an unlock command provided by their respective mobile devices.

One embodiment provides a method performed via execution of a software application at a mobile device, for managing bookings and access control, the method including:

(i) communicating, via networked communications, with a server device thereby to complete a booking in respect of a resource, wherein the resource is associated with a networked locking device; and (ii) following (i), providing a function thereby to provide a signal to selectively unlock the networked locking device.

One embodiment provides a method wherein the function is provided only when within a threshold proximity of the networked locking device.

One embodiment provides a computer program product for performing a method as described herein.

One embodiment provides a non-transitory carrier medium for carrying computer executable code that, when executed on a processor, causes the processor to perform a method as described herein.

One embodiment provides a system configured for performing a method as described herein.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

BRIEF DESCRIPTION OF THE DRAWINGS

Embodiments of the invention will now be described, by way of example only, with reference to the accompanying drawings in which.

DETAILED DESCRIPTION

Described herein are frameworks and methodologies configured to enable integration of booking and access control for service providers. Embodiments of the invention have been particularly developed for allowing a user to gain access to an access controlled resource (for example a hotel room or the like) via a mobile device. This preferably occurs in the context of an arrangement where access rights are provided in real time upon completion of a booking. For example, some embodiments operate in the context of a mobile app and associated supporting infrastructure thereby to provide functionality to (i) find an available suitable resource; (ii) book that resource; (iii) provide payment; and (iv) gain access via the same mobile device. In some embodiments the technology leverages third party platforms for (i) to (iii), and provides (iv) based on output from processes at the third party platform(s). While some embodiments will be described herein with particular reference to that application, it will be appreciated that the invention is not limited to such a field of use, and is applicable in broader contexts.

Overview

Technologies described herein have been developed thereby to provide an end-to-end solution that enables integration of booking and access control.

In overview, physical and/or practical access to various forms of bookable resources are controlled by access control devices. A primary example discussed herein is that of an accommodation, such as a hotel room or the like. In such cases, the access control device typically takes the form of a door lock (for example an electromagnetically actuated latch or the like). However, that example is not limiting on application of the technological frameworks, which are readily implemented in other environments.

Examples of bookable resources to which the technologies described herein are applicable include (but are not limited to) the following: (i) accommodations, such as hotels; (ii) reservable areas, such as office spaces, picnic grounds, and the like; (iii) parking spaces, including on-street and off-street parking; (iv) disabled facilities, such as disabled toilets; (v) vehicles, for example rental cars; (vi) seating at venues, including anything from entertainment venues (for example live music and/or cinema seats) to tables at restaurants cafes and the like; (vii) bookable transportation; and (viii) bookable equipment that is contained and/or use-restricted by access control devices. It will be appreciated that any of these resources may be associated with a form of access control device to which access may be granted thereby to enable a user to gain practical/functional/legitimate access to the resource.

As used herein, the term "access control device" refers to any device that is configured to progress between a first state, in which access is restricted, and a second state, in which access is available to be granted. In the case of a door lock, the first state is a locked state, and the second state is an unlocked state. This prevents or enables physical access. There are a range of other device types that also are configured to prevent or enable physical access, including (but not limited to): other door controllers, retractable bollards and boom-gates (and other devices used to restrict/enable passage of a vehicle), devices configured to prevent removal of physical objects, and so on. The preceding examples physically prevent access.

There are also forms of access control device that prevent/enable access in a less direct manner, for example access control devices that provide a visual indicator as to whether access is prevented or enabled. A simple example is an access control device that includes coloured lighting devices that indicate a "reserved" or "available" state, a "permitted" or "restricted state", and in various other combinations of two or more states. These are often used in situations where it is impractical to use actual access prevention means. An example specifically considered herein is that of on-street parking; as discussed further below the use of an access control device that indicates via visual means, a state associated with a parking space (for example available/reserved/in-use).

In embodiments considered herein, an access control device (such as a lock device) is controllable via a computer network, for example via WiFi or other wireless communication means. That may be achieved by providing either a wirelessly controllable lock, or a wirelessly controlled actuator that is able to be coupled to a lock. In one preferred embodiment, relating to access control devices that operate on doors, makes use of a wirelessly controllable door striker, which is able to be retrofitted to substantially any door (without necessitating removal of existing locks, provided those are able to be maintained in an unlocked state).

A user books a resource associated with a specific access control device, preferably using a mobile app. This involves an interaction between the mobile app and a server, for example a server that provides a bookings engine. Upon completion of the booking, the server configures the mobile app with permission to gain access via the relevant specific access control device. This permission is preferably time-limited, with the time corresponding to the relevant booking, and is in some embodiments location-limited (requiring the mobile device to be within a specific geographic zone to use the permission). In some cases the granting of this permission requires providing a configuration signal to both the mobile app and the lock device.

In the context of a hotel room, a user books a hotel room associated with a specific lock device, preferably using a mobile app. This involves an interaction between the mobile app and a server, for example a server that provides a bookings engine. Upon completion of the booking, the server configures the mobile app with permission to unlock the relevant specific lock device. This permission is preferably time-limited, with the time corresponding to the relevant booking, and requires that the user is within a defined geographic zone to user the permission (for example in some embodiments using the permission requires a connection of the mobile device to a local WiFi network).

In the context of a parking space, a user books a parking space associated with a specific access control device, preferably using a mobile app. This involves an interaction between the mobile app and a server, for example a server that provides a bookings engine. Upon completion of the booking, the server configures the mobile app with permission to affect the access control device, for example by causing it to progress a visual display device from a "reserved state" to a state that indicates that the correct booked user has arrived. Again, the permission is preferably time-limited, with the time corresponding to the relevant booking.

One embodiment provides a computer implemented method, performed by one or more server devices, configured to enable managing bookings and access control. For example, this may be provided by a server device that interfaces with one or more third party bookings engines, or a server that inherently provides its own bookings engine.

The method includes providing an interface that is configured to communicate with a plurality of client mobile devices, wherein each client mobile device executes a prescribed software application. Various technologies that enable a server to exchange data with mobile apps (for example iOS and Android apps) are well known in the art. It will also be appreciated that further embodiments include methods performed via the prescribed mobile device in the contest of its interactions with the one or more servers.

In this case, each executing instance of the prescribed software application is configured to provide a user interface that: (i) identifies a resource in respect of which a time-specific booking has been made; and (ii) provides a user interface component configured to enable the user to access an access-controlled functionality provided by an access control device associated with the time specific booking.

One of the one or more servers receives a signal representative of completion of a booking of a resource. For example, the booking occurs via a mobile device via a bookings interface (optionally via the prescribed app). The booking may be handled by a first party or third party booking engine. The booking is associated with: a specific access control device; a user account; and timing parameters (for example timing parameters that define a time for the booking, preferably by reference to times for which access permissions are to be granted in respect of the specific access control device).

Based on the received signal, the method includes configuring the user interface of a specific one of the client mobile devices, being a client mobile device associated with the user account, to: (i) provide data identifying the booked resource as the resource in respect of which a time-specific booking has been made; and (ii) configure the user interface component configured to enable the user to access an access-controlled functionality provided by the specific access control device in accordance with the timing parameters. That is, a user makes a booking, and is provided (preferably substantially instantaneously) with access permission (via the mobile device) to access an access-controlled functionality relevant to the booking. For example, the user is provided with an "unlock" button that will allow the user to unlock a door during a time period associated with the booking.

In some embodiments the method includes, in response to the receiving of the signal representative of completion of a booking of a resource, wherein the booking is associated with: a specific access control device; a user account; and timing parameters: setting an access permission associated with the user account for the access control device; receiving, from the specific one of the client mobile devices, via user interaction with the user interface component, a request to access a controlled functionality of the specific access control device; processing the request based on the access permission; determining that the request is to be granted; and providing a signal that is configured to cause the specific access control device to grant access to the controlled functionality. That is, as opposed to providing to the mobile device an electronic access key or the like, a server device is responsible to processing an access request from a mobile device, and based on that request, selectively instructing the access control device to grant access. The following examples are provided as context: in some embodiments the specific access control device is a door lock, and wherein the controlled functionality is unlocking of the door lock; in some embodiments the specific access control device includes an access prevention apparatus, and the controlled functionality includes progressing the access prevent apparatus from a first state to a second state; and in some embodiments the specific access control device includes a visual display component, and the controlled functionality includes progressing the visual display component from a first state to a second state.

In some embodiments the bookings of the resource is managed by a booking engine, and wherein the bookings engine is configured to determine booking availability of a resource based on time slices for which access control permissions are granted in respect of an access control device associated with the resource. In this regard, the technologies described herein provide "access control centric booking management"—the availability of a resource is determined by reference to whether access rights are available for granting for a given time slice.

Exemplary Framework

Figure 1A:
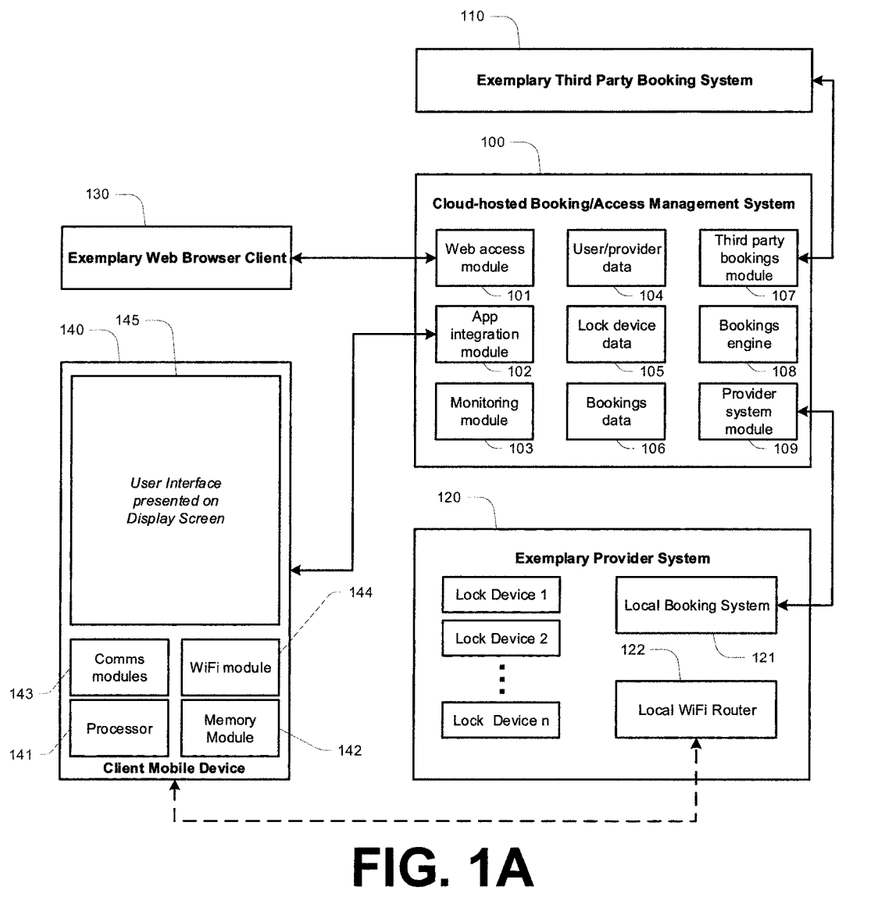
FIG. 1A and FIG. 1B schematically illustrate a frameworks according to embodiments.
Figure 1B:
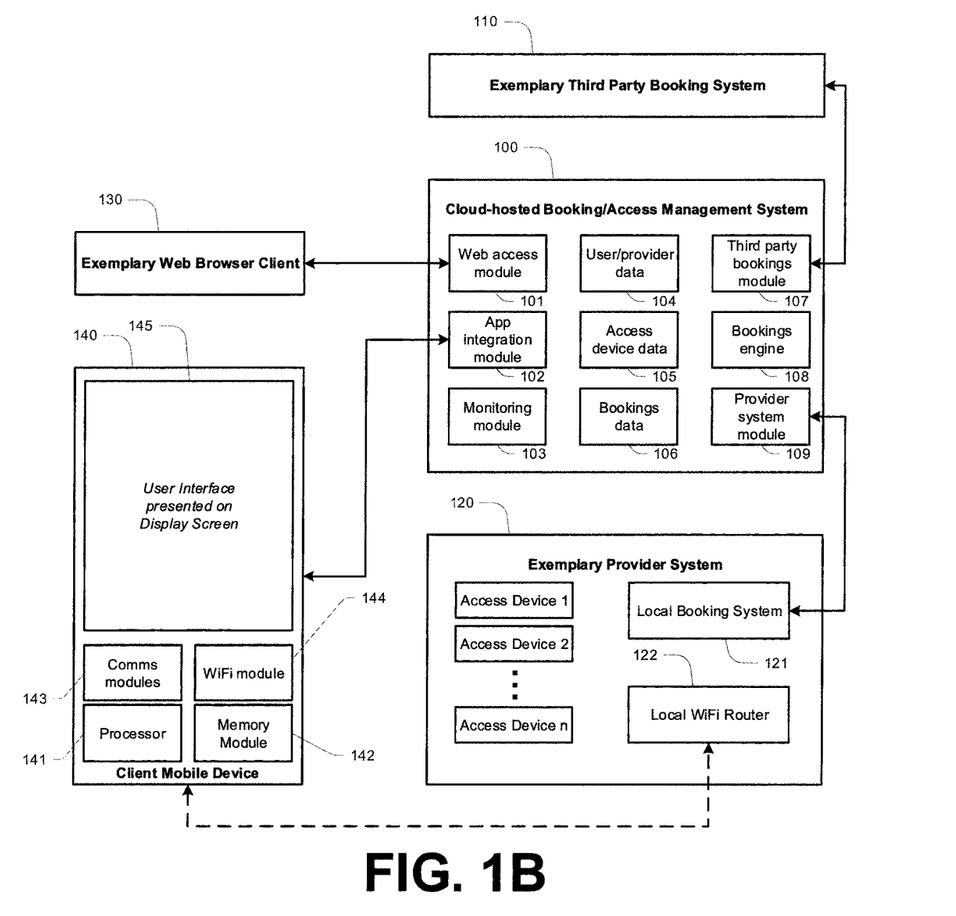

FIG. 1A illustrates a framework according to one embodiment, relating to a context where access control devices in the form of door locks are present. FIG. 1B illustrates a similar example relating to access control devices more generally (for example in the context of a parking reservation management arrangement).

The framework of FIG. 1A centres upon a cloud-hosted booking/access management system 100. System 100 may be defined by one or more computer devices, for example by a collection of servers that are configured to intercommunicate.

Server 100 maintains access to various repositories of data. These include user/provider data 104, which includes records identifying users registered to use system 100, and also registered providers (for example hotels). Lock device data 105 is representative of individual lock devices that are commissioned to operate with system 105. Each lock device is associated with a unique identifier, and in some cases with information concerning a resource (for example a hotel room) associated with the lock device. For example, each lock device may be associated with address data, room data (for example number of beds, views, etc.), hotel data (for example other facilities), address data, availability data, and so on. Bookings data 106 is indicative of bookings that have been made.

A bookings engine 108 is configured to enable a user to make bookings. These bookings may be made, in the illustrated embodiment, via three distinct means:

Using a mobile device 140, which executes a mobile app configured to interact with server 100 via an app integration module 103. An exemplary mobile app is disclosed in more detail further below.

Using a computing device that executes a web browser, enabling interaction with server 100 via a website and a web-access module 101.

Via a third party booking system, which is configured to integrate with system 100 via a third party bookings module 107. In some embodiments this approach still requires the user to install a particular mobile app associated with system 100 for the purposes of door unlocking; in other cases that functionality is integrated into a mobile app associated with the relevant third party bookings engine.

Bookings engine 109 is configured to push downstream data to local systems to which lock devices are connected, such as exemplary provider system 120. System 120 includes a local booking system 121, a local WiFi router 122, and a plurality of lock devices coupled to the router.

Module 109 is configured to enable synchronisation between bookings engine 108 and bookings engine 121 for bookings relating to locking devices associated with system 120. In this regard, system 120 is able to operate in an offline mode, such that a user is able to access booking system 121 and/or one or more of the lock devices via local WiFi in the case that there are communication issues affecting either of both of device 140 to system 100 or system 100 to system 120. Synchronisation preferably includes synchronisation of both bookings and users details with the local provider systems.

In a preferred embodiment, each lock device (or each controller device physically coupled to a lock device includes a processor, WiFi module, and memory. The memory maintains software instructions that enable the performance of various methods, including an auto configuration method. The auto configuration method includes executing a script that communicates to server 100 data indicative of the device and its MAC address, and performs an automated enrolment procedure with respect to local booking system 121. A user is able to manually associate the configured/enrolled lock device with room data.

Local router 122 in combination with local booking system 121 provide a local hub for a backend fallback in the case that communications with server 100 fail. Preferably, local booking system executes software instructions that provide a monitoring protocol thereby to determine whether to switch to a backend fallback mode, and/or switch to a connected online mode. Furthermore, the Local router 122 in combination with local booking system 121 provide a local web service thereby to enable booking without a connection to remote servers.

System 100 also provides a monitoring module 103, which is configured to monitor the operation of each connected lock device (for example lock/unlock/error notifications). This may be mirrored and/or supplemented by a corresponding monitoring module at each local provider system. A process executed thereby to compare door open/close operations relative to service and booking schedules. Where a door is unlocked outside of a defined booking or service time, an alert is raised.

A cloud-hosted system, such as that shown in FIG. 1A and FIG. 1B, allows for aggregation of resources associated with access control devices across a plurality of client systems, optionally across a plurality of booking engines.

Exemplary App

An exemplary mobile app is described below. This is described by reference to an example implemented in the context of accommodation bookings. However, it will be appreciated that other such apps are provided to handle bookings that relate to alternate forms of access control devices in further contexts.

As noted, client mobile devices, such as device 140, install and execute a proprietary mobile app thereby to interact with system 100 and/or its associated lock devices. This mobile app is maintained on a memory module 142 and executes via a processor 141. A user interface is thereby presented on a display screen 145.

In some embodiments, corresponding functionalities to the mobile app are provided via a web server/web browser arrangement (that is, rather than a proprietary app, a mobile device loads a user interface via a web browser application which downloads web page data from a server).

The mobile app is configured to display a booking interface. The booking interface preferably includes a map-based display, which visually represents locations of available resources (e.g. hotel rooms) based on the locations of registered lock devices, in response to a user query. A default query may be executed thereby to initially display geospatially relevant resources that are currently available for booking (i.e. for the current day/night). The user may also submit queries based on different locations and/or dates. The availabilities shown are based on bookings data 106 of system 100, which is associated to lock device data.

Once a booking is made, the mobile app is given access to open the relevant lock device during a period of time defined for the booking. Preferably, this includes displaying, via the mobile app, an "unlock" button for the door when predefined conditions are met. In some cases a single booking results in multiple "unlock" buttons for multiple doors, for example building general entry doors, garage doors, gymnasiums, etc. The "unlock" button is in some embodiments displayed and/or displayed in an active state when predefined conditions are met. These may include time, and mobile device location.

An "unlock" command may also be provided for other resources that are WiFi unlockable, for example television services, Internet, and so on. This is, in some embodiments, used to enable up-selling of services via the mobile app. That is, a user purchases additional services, and in response to that purchase is granted permission to access controlled functionalities of one or more further access control devices, including doors, electronic devices, and so on. For example, the mobile app may enable a user to gain access to additional doors (such as a gymnasium door) or resources (such as in-room broadband) via the mobile device, with the access being provided much in the same was as room entry.

When unlocking a door, the app is configured to, by default, communicate with sever 100, and an unlock command is provided via server 100 and local booking system 121 to the relevant door. In some embodiments the default communication is via local booking system 121. In some embodiments, the app is configured to automatically switch to a local WiFi network (provided by router 122) in the event that unlocking via Internet fails.

Preferably, the mobile app enables real-time access to a door (for example placing a booking when standing at the door, and being provided with access automatically and substantially immediately (noting processing/network delays). In some embodiments, real-time access is subject to a final availability check, which, for example, checks whether a door has been accessed since a last expected access event (for example an access event corresponding to completion of a room service).

In some embodiments a "two click" (or similar) purchase is provided for registered users, whereby a user selects a room, then clicks to pay, and subject to authorization of a payment using stored credentials, access is provided.

The mobile app preferably also provides floor maps with directions to rooms and/or amenities.

In some cases, a given booking is able to be associated with multiple registered users, in which case access rights are provided to multiple mobile devices associated with those users.

Figure 2:
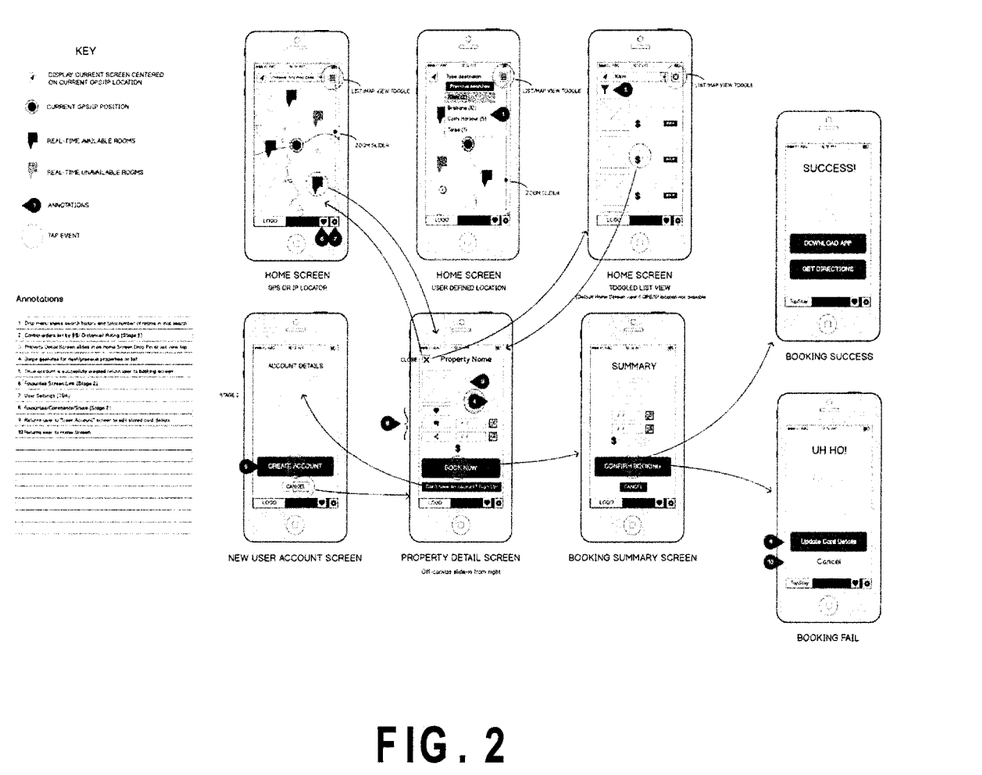
FIG. 2 illustrates exemplary mobile device screenshots.

FIG. 2 illustrates various exemplary mobile app screenshots.

In preferred embodiments, the mobile app provides functionality to speak to help staff via VOIP or other Internet-based communications technologies. It will be appreciated that, where a mobile device connects to local WiFi, this does away with a need for a user to have local cellular access (this is particularly relevant in hotel environments where guests may be from international locations).

Exemplary Accommodation-Specific Functionalities

Various enhancements are made to technologies described herein thereby to provide useful functionalities relevant to implementation in accommodation booking/access environments.

A first enhancement includes enabling a user of a mobile app to progress the access control device associated with their booking into a "do not disturb" mode. Authorization and coordination of such a process is similar to providing an "unlock" command, in the sense that it ultimately causes a change in state to the access control device. However, in this case the access control device is progressed into a locked mode whereby it is not able to be unlocked using keys associated with cleaning/maintenance staff (or via other means of practically implementing a "do not disturb" arrangement).

In some embodiments a second mobile app is provided, being a service app. This app is used by service personnel (for example maids), thereby to transition the room into a "serviced" or "available" state following completion of a post-booking service. This allows a given room (or other lock device accessed resource) to be made available for booking once again via system 100. For example, one exemplary computer implemented method includes:
(i) A customer places a booking for a specific room via a mobile app;
(ii) In response to the placing of the booking, the customer is granted access control permissions to access the specific room from a default booking start time;
(iii) At a time preceding the booking start time, a service person provides a "servicing complete" signal using the service app to indicate that the specific room has been serviced;
(iv) In response to the "servicing complete" signal, a server device modifies the granted access control permissions to access the specific room at a sooner time (for example right away); and
(v) A notification is communicated to the customer's mobile device (optionally via the mobile app) to inform the customer that they can now access their room.

Similar methods may be performed in alternate contexts, where a signal is received that indicates a resource is available early for an upcoming booking, and access control is accordingly granted from an earlier-than-default time.

Integration with Building Management System Functionalities

As noted above, in some embodiments when placing a booking associated with a particular access control device, a user is granted access to that device plus a plurality of further access control devices that are required to gain access to the relevant booked resource. For example, in the context of a hotel, this may include granting access permissions in respect of an access control device defined by a door lock for a booked room, and additionally to access control devices associated with infrastructure such as external building doors, elevators, and the like.

In some embodiments, coordination of granting access permissions to additional access control devices is implemented by way of building management system level permissions. That is, data representative of access control devices is defined in a building management system, along with rules for granting access permissions across a set of devices to users of predefined permission levels. For example, an exemplary method includes:
(i) A customer places a booking for a specific room via a mobile app;
(ii) In response to the placing of the booking, the customer is granted access control permissions to access the specific room from a default booking start time;
(iii) A building management system level access permission type is determined for the booking; and
(iv) The customer is granted access to further access control devices based on the determined permission type.

In some embodiments the building management system is an existing building management system. In other embodiments the building management system is defined by aggregated management of a plurality of access control devices based on a framework as shown in FIG. 1B.

Exemplary Server/Device Arrangements

FIG. 4A to FIG. 4D illustrate a plurality of alternate arrangements for coordinating bookings and access. These illustrate: a bookings engine 401 (for example a platform via which a customer places a booking), a back-end management system which maintains data representative of availability, and associates access control devices with user permission data (for example access permissions based on bookings made via the bookings engine); a local server 405, which operates at a site (such as a hotel), and preferably operates on a local WiFi network to which local mobile devices are able to connect; a user mobile device 404 (which is used to gain access, and preferably also to place bookings), and an access control device 403.

Figure 4A:
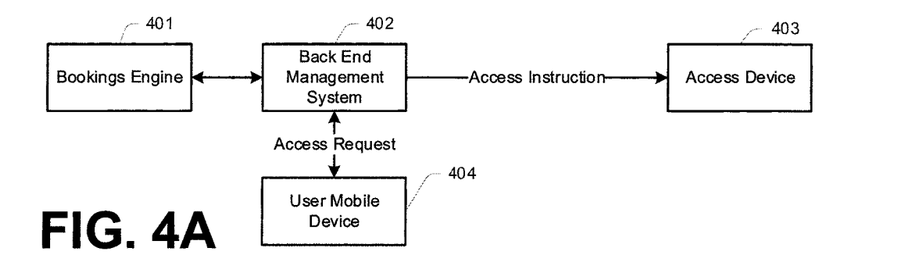
FIG. 4A illustrates a communication arrangement according to one embodiment.

In the example of FIG. 4A, a user provides an access request via their mobile device, which communicates via the Internet (for example over a cellular network) to system 402, and system 402 is responsible for providing an access control instruction to device 403 (again, via the Internet).

Figure 4B:
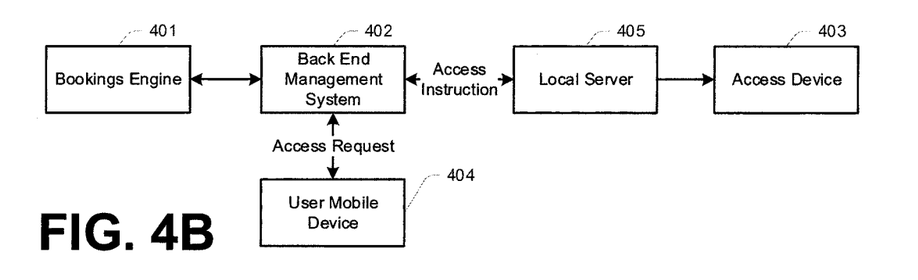
FIG. 4B illustrates a communication arrangement according to one embodiment.

In the example of FIG. 4B, a user provides an access request via their mobile device, which communicates via the Internet (for example over a cellular network) to system 402, and system 402 is responsible for providing an access control instruction to local server 405 (again, via the Internet), which passes the access control instruction to access device 403 (for example via a local wireless network).

Figure 4C:
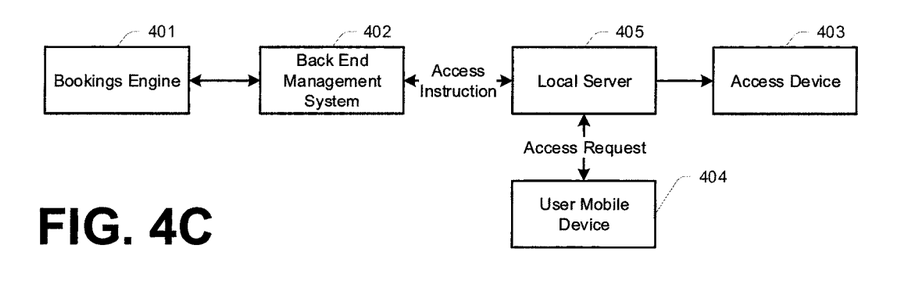
FIG. 4C illustrates a communication arrangement according to one embodiment.

In the example of FIG. 4C, a user provides an access request via their mobile device via a local WiFi network to local server 405, which communicates via the Internet (for example over a cellular network) to system 402, and system 402 is responsible for providing an access control instruction to local server 405 (again, via the Internet), which passes the access control instruction to access device 403 (for example via a local wireless network).

Figure 4D:
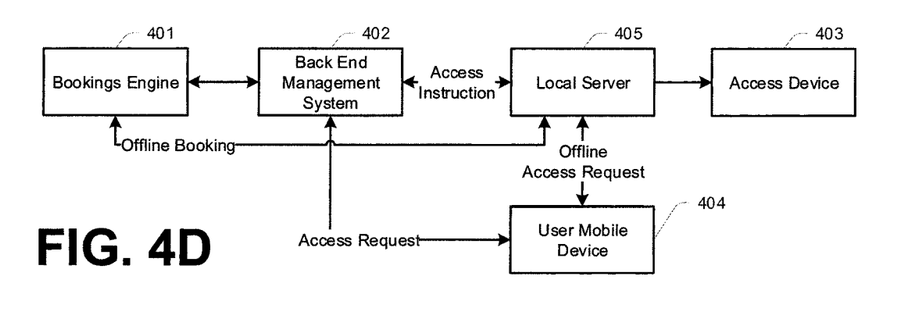
FIG. 4D illustrates a communication arrangement according to one embodiment.

In the example of FIG. 4D, local server 405 is configured to operate in an offline mode where there is no need for a connection to system 403.

Exemplary Parking Reservation Arrangement

Figure 5A:
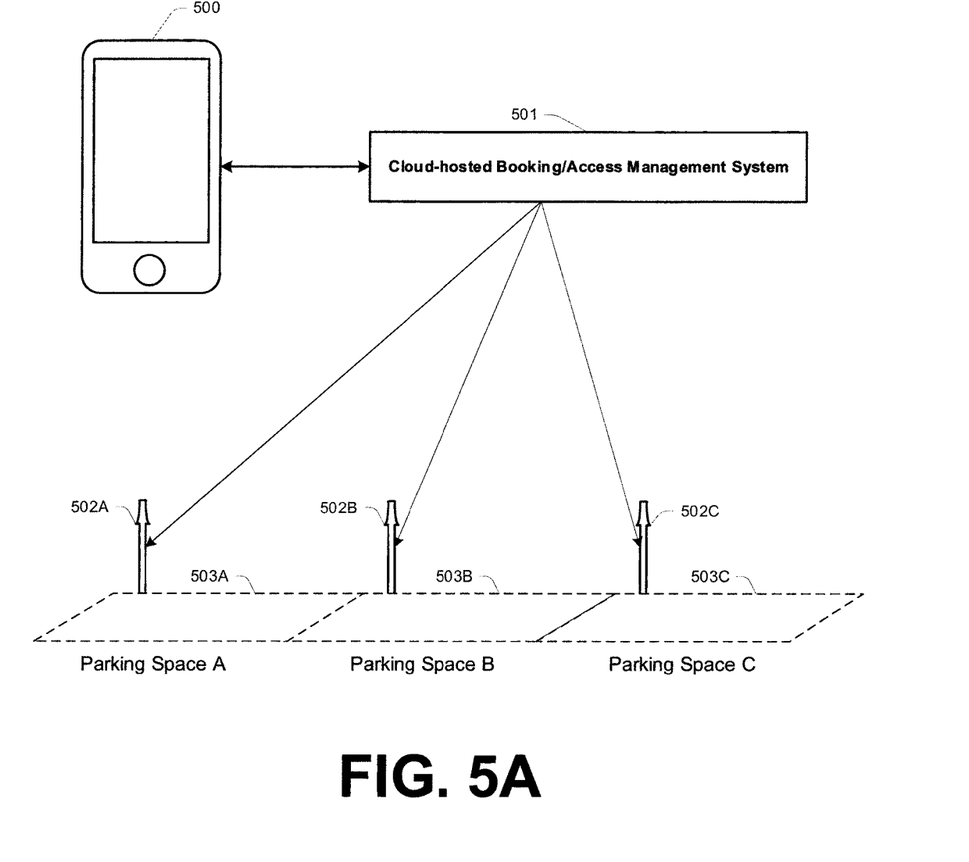
FIG. 5A illustrates a parking arrangement according to one embodiment.
Figure 5B:
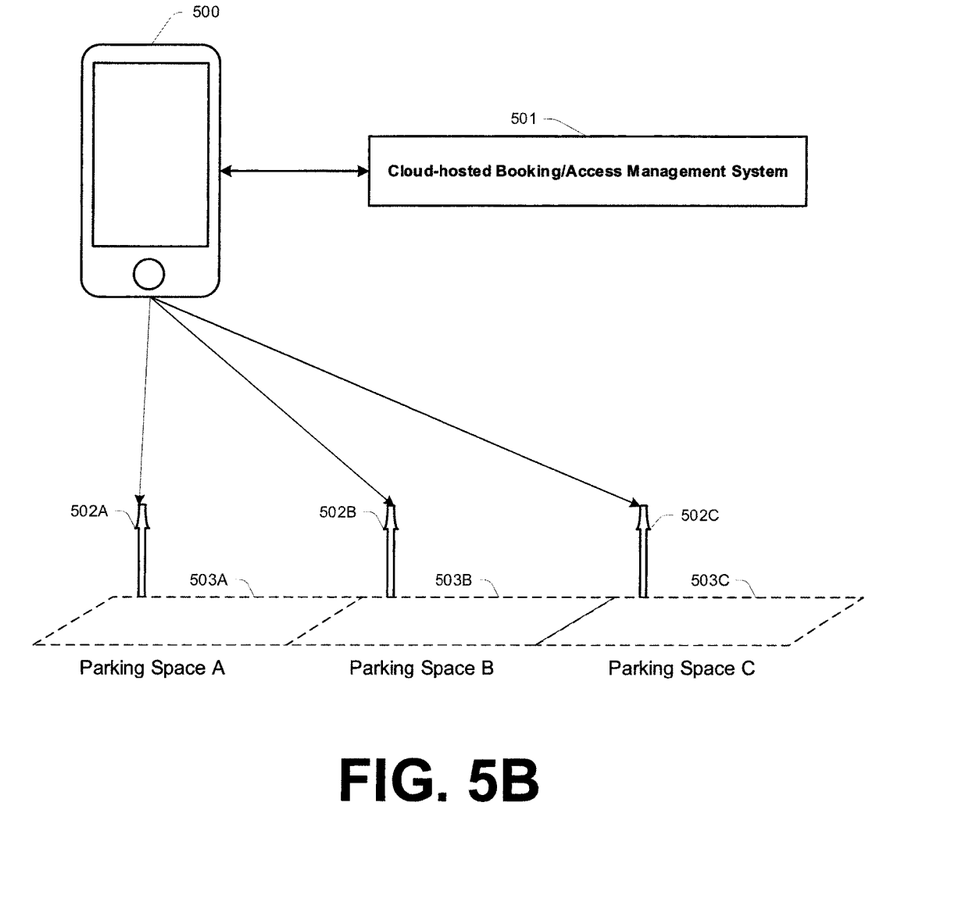
FIG. 5B illustrates a parking arrangement according to one embodiment.

FIG. 5A and FIG. 5B illustrate exemplary parking reservation arrangements. These optionally leverage an arrangement such as that shown in FIG. 1A. Embodiments are described by reference to an "on-street" parking arrangement, whereby there is no preventative access control (such as a retractable bollard or the like). However, it will be appreciated that the lighting arrangement shown in the drawings is in other embodiments substituted/supplemented by physical access prevention means such as bollards, spikes and the like.

A user of a mobile device 500 interacts (directly or indirectly) with a cloud hosted booking/access management system 501. For example, the user submits a query representative of a location and a booking time, thereby to (if available) identify a parking space that suits their needs. The query is executed against a database that maintains time-based granting of access permissions to users for access control devices associated with parking spaces. In this example, the access control devices include display posts 502A to 502C, respectively associated with spaces 503A to 503C. The user makes a selection, provides a payment, and is granted a booking with an associated access permission right.

In some embodiments, each of display posts 502A to 502C is configured to provide a visual identifier representative of whether its respective space is currently available, or booked. In some embodiments the "booked" state commences a predefined period (for example 5 minutes) preceding a defined booking.

Upon arriving at a booked parking space, a user parks, and then by way of mobile device 500 interacts with the relevant display post. This is preferably an interaction via server 501, although as shown in FIG. 5B it may be a local interaction. In any case, this informs the post and/or server that the correct user is parked in the space in compliance with a booking, and causes the relevant display post to indicate that a parked car belongs to a user that has placed a booking.

In some embodiments each display post is configured to provided data representative of an upcoming booking, and prevent a preceding user from locally obtaining parking rights interfering with that booking. For example, assume User A has made a booking for space 503A from 2:00 to 2:30, and that there are no bookings for 1:00 to 2:00. Assume User B arrives at 1:15. User B is enabled to locally interact with display post 502A thereby to pay for parking rights up to 2:00 at the latest. In some cases this is to 1:55 at the latest, thereby to implement a "buffer time".

In some embodiments vehicle identification devices are provides, for example, pressure sensors. These pressure sensors may be used to provide functionalities such as: (i) providing a visual indication to identify a car that is parked without permission; (ii) providing notifications in the lead up to a booking to indicate whether the relevant space is vacant; (iii) identifying whether a vehicle has vacated a spot in the lead-up to completion of a booking, and optionally providing notifications in response; and (iv) other real-time monitoring functionalities.

Exemplary Client-Server Framework

Figure 3:
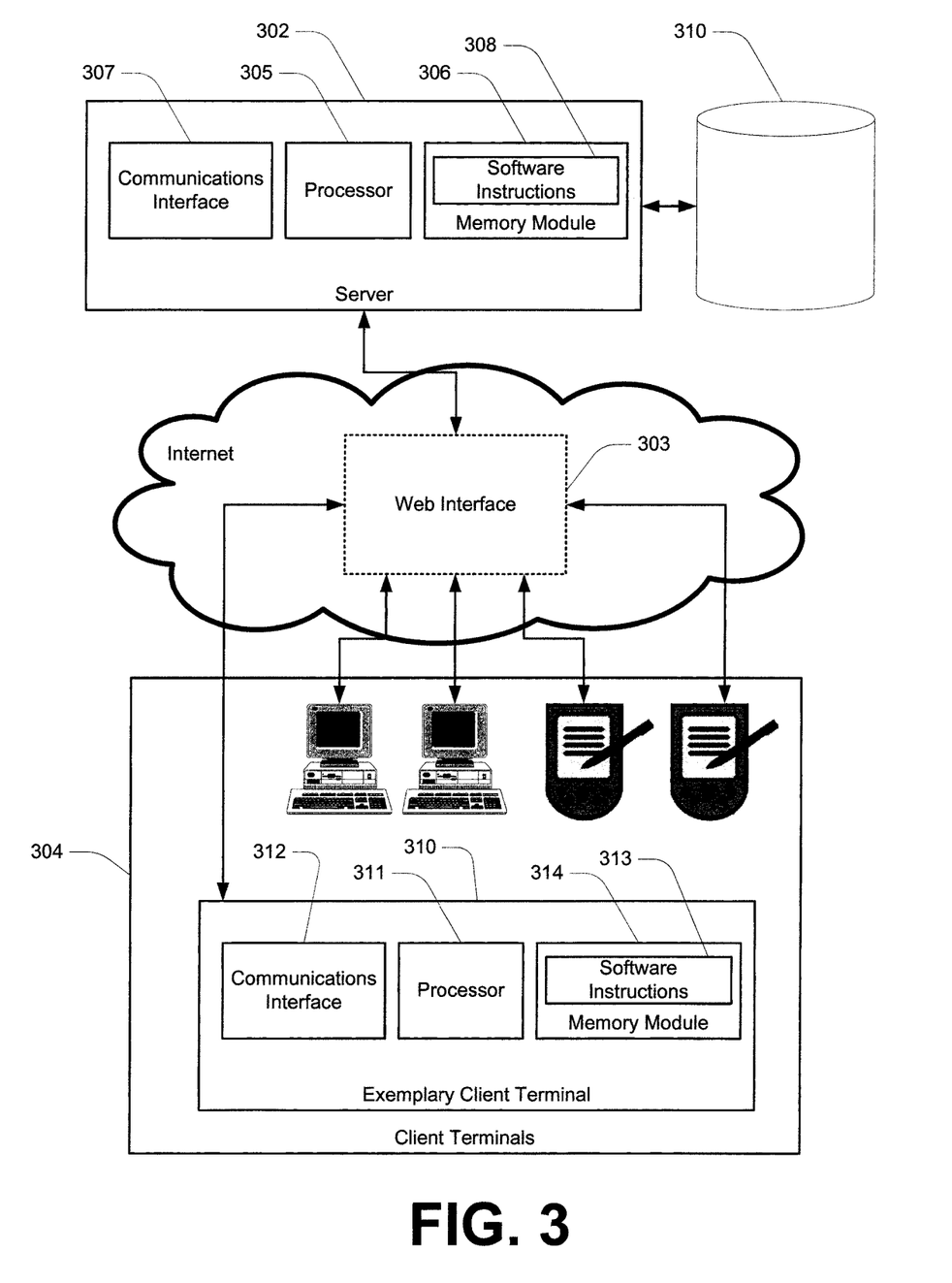
FIG. 3 illustrates a client-server framework leveraged by various embodiments.

In some embodiments, methods and functionalities considered herein are implemented by way of a server, as illustrated in FIG. 3. In overview, a web server 302 provides a web interface 303. This web interface is accessed by the parties by way of client terminals 304. In overview, users access interface 303 over the Internet by way of client terminals 304, which in various embodiments include the likes of personal computers, PDAs, cellular telephones, gaming consoles, and other Internet enabled devices.

Server 303 includes a processor 305 coupled to a memory module 306 and a communications interface 307, such as an Internet connection, modem, Ethernet port, wireless network card, serial port, or the like. In other embodiments distributed resources are used. For example, in one embodiment server 302 includes a plurality of distributed servers having respective storage, processing and communications resources. Memory module 306 includes software instructions 308, which are executable on processor 305.

Server 302 is coupled to a database 310. In further embodiments the database leverages memory module 306.

In some embodiments web interface 303 includes a website. The term "website" should be read broadly to cover substantially any source of information accessible over the Internet or another communications network (such as WAN, LAN or WLAN) via a browser application running on a client terminal. In some embodiments, a website is a source of information made available by a server and accessible over the Internet by a web-browser application running on a client terminal. The web-browser application downloads code, such as HTML code, from the server. This code is executable through the web-browser on the client terminal for providing a graphical and often interactive representation of the website on the client terminal. By way of the web-browser application, a user of the client terminal is able to navigate between and throughout various web pages provided by the website, and access various functionalities that are provided.

Although some embodiments make use of a website/browser-based implementation, in other embodiments proprietary software methods are implemented as an alternative. For example, in such embodiments client terminals 304 maintain software instructions for a computer program product that essentially provides access to a portal via which framework 100 is accessed (for instance via an iPhone app or the like).

In general terms, each terminal 304 includes a processor 311 coupled to a memory module 313 and a communications interface 312, such as an internet connection, modem, Ethernet port, serial port, or the like. Memory module 313 includes software instructions 314, which are executable on processor 311. These software instructions allow terminal 304 to execute a software application, such as a proprietary application or web browser application and thereby render on-screen a user interface and allow communication with server 302. This user interface allows for the creation, viewing and administration of profiles, access to the internal communications interface, and various other functionalities.

Interpretation

Unless specifically stated otherwise, as apparent from the following discussions, it is appreciated that throughout the specification discussions utilizing terms such as "processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A computer implemented method, performed by one or more server devices, configured to selectively unlock doors at accommodations including hotel rooms, the method including:
providing an interface that is configured to communicate with a plurality of client mobile devices, wherein each client mobile device executes a prescribed software application, wherein each executing instance of the prescribed software application is configured to provide a user interface that:
(i) identifies an accommodation in respect of which a time-specific booking has been made; and
(ii) provides a user interface component configured to enable a user to cause unlocking of a door of the particular accommodation in accordance with the time specific booking;
receiving a signal representative of a completion of the time-specific booking of a particular accommodation, wherein the time-specific booking is associated with a particular accommodation networked door lock device for the particular accommodation; a user account; and timing parameters; and
based on the signal received, configuring the user interface of a specific one of the client mobile devices, being a client mobile device associated with the user account, to:
(i) provide data identifying the completion of the time-specific booking of the particular accommodation; and
(ii) configure the user interface component to enable the user to submit an instruction via the user interface which is representative of a request to unlock the door for the particular accommodation;
in response to the receiving of the signal representative of the completion of the time-specific booking of the particular accommodation, wherein the time-specific booking is associated with the particular accommodation networked door lock device for particular accommodation; the user account; and the timing parameters:
setting an access permission associated with the user account for the particular accommodation networked door lock device for the particular accommodation;
receiving, from the specific one of the client mobile devices via the user interaction with the user interface component, the instruction which is representative of the request to unlock the door for the particular accommodation;
processing the request based on the access permission;
determining that the request is to be granted; and
providing a secure signal to cause the particular accommodation networked door lock device for the particular accommodation to transition into an unlocked state thereby to grant access to the particular accommodation in accordance with the time-specific booking of the accommodation;
wherein each of the client mobile device, each server device, and each particular accommodation networked door lock device are distinct devices on a common computer network.

2. A method according to claim 1 wherein the submitting of the instruction via the user interface which is representative of the request to unlock the door for that particular accommodation is achievable in an online mode and an offline mode, wherein the online mode leverages Internet communications between the client mobile device and the particular accommodation networked door lock device via one or more remote intermediaries, and the offline mode leverages local WiFi communications between the client mobile device and the particular accommodation networked door lock device via none or more local intermediaries.

3. A method according to claim 1 wherein the time-specific booking of the particular accommodation is managed by a booking engine, and wherein the booking engine is configured to determine booking availability of a plurality of particular accommodations based on time slices.

4. A method according to claim 1 including providing an interface that is configured to enable the user to place a booking via the prescribed software application.

5. A method according to claim 1, wherein a determination to unlock the particular accommodation networked door lock device occurs only where location data transmitted to the server device by the client mobile device indicates that the client mobile device is within a threshold proximity of the particular accommodation networked door locking device.

6. A method according to claim 1, wherein the server device, the particular accommodation associated networked door lock device, and the mobile device are connected to a common local computer network.

7. A computer implemented method, performed by a client mobile device, configured to enable access control in respect of one or more bookings, the method including:
   communicating, via networked communications, with a server device thereby to complete a time-specific booking in respect of a particular accommodation, wherein the particular accommodation has a defined networked door locking device which is configured to be transitioned from a locked state to an unlocked state via a secure signal provided by the server device thereby to unlock the particular accommodation; and
   in respect of a completed booking, providing a function via a software application thereby to enable transmission to the server device of an unlock request signal representative of a request to unlock the particular accommodation, wherein the unlock request signal is transmitted to the server device, wherein the server device is configured to: (i) process the unlock request signal thereby to determine whether to unlock the particular accommodation; and (ii) in the case that the server device determines to unlock the particular accommodation, the server device transmitting the secure signal to the defined networked door locking device for the particular accommodation thereby to cause the unlocking;
   wherein each client mobile device, the server device, and the defined networked locking device are distinct devices on a common computer network.

8. A method according to claim 7, wherein a determination to unlock the defined networked door locking device occurs only where location data transmitted to the server device by the client mobile device indicates that the client mobile device is within a threshold proximity of the defined networked door locking device.

9. A method according to claim 7, wherein the server device, the defined networked door locking device, and the client mobile device are connected to a common local computer network.

10. A computer implemented method for managing unlocking of accommodation doors in respect of time-specific bookings, the method including:

(i) maintaining a cloud-hosted bookings engine, wherein the cloud-hosted bookings engine enables bookings of accommodations at a plurality of client sites, wherein each cloud-hosted booking is associated with a particular accommodation specific associated networked door locking device; and (ii) enabling a user associated with a given cloud-hosted booking for a particular accommodation to unlock the particular accommodation specific associated networked door locking device for the particular accommodation via an unlock command provided by a mobile device associated with the user;

wherein enabling the user associated with the given cloud-hosting booking to unlock the particular accommodation specific associated networked door locking device for the particular accommodation via the unlock command provided by the mobile device associated with the user includes:
   (i) the mobile device transmitting an unlock request signal to a server device;
   (ii) the server device processing the unlock request signal thereby to determine: (A) details of the given cloud-hosting booking, including the particular accommodation and timing information; and (B) whether to unlock the particular accommodation specific associated networked locking device based on the details of the given cloud-hosting booking, including the particular accommodation and timing information; and
   (iii) the server device determines to unlock the particular accommodation specific associated networked door locking device for the particular accommodation, the server device transmitting a control signal to the particular accommodation specific associated networked door locking device for the particular accommodation thereby to cause the unlocking;

wherein each client mobile device, the server device, and the particular accommodation specific associated networked door locking device are distinct devices on a common computer network.

11. A method according to claim 10 wherein a determination to unlock the particular accommodation specific associated networked door locking device occurs only where location data transmitted to the server device by the client mobile device indicates that the client mobile device is within a threshold proximity of the particular accommodation specific associated networked door locking device.

12. A method according to claim 10, wherein the server device, the particular accommodation specific associated networked door locking device, and the client mobile device are connected to a common local computer network.

* * * * *

UNITED STATES PATENT AND TRADEMARK OFFICE
CERTIFICATE OF CORRECTION

PATENT NO.        : 10,769,556 B2
APPLICATION NO.   : 15/328779
DATED             : September 8, 2020
INVENTOR(S)       : Giuseppe Maria Caffo and Lawrance Crestani It is certified that error appears in the above-identified patent and that said Letters Patent is hereby corrected as shown below:

In the Claims

1. At Column 20, Line 5, Claim 1, Line 15, please insert a -- - -- after the word "time".

2. At Column 20, Line 27, Claim 1, Line 37, please insert the word --the-- before the word "particular".

3. At Column 20, Line 44, Claim 1, Line 54, please insert the word --particular-- before the word "accomodation".

4. At Column 22, Line 30, Claim 10, Line 33, please insert the word --if-- after "(iii)".

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*